(12) United States Patent
Takenaka et al.

(10) Patent No.: US 9,043,721 B2
(45) Date of Patent: May 26, 2015

(54) VEHICULAR MANIPULATION APPARATUS

(71) Applicant: DENSO CORPORATION, Kariya, Aichi-pref. (JP)

(72) Inventors: Kenichi Takenaka, Anjo (JP); Shigeaki Nishihashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 13/670,764

(22) Filed: Nov. 7, 2012

(65) Prior Publication Data

US 2013/0117706 A1    May 9, 2013

(30) Foreign Application Priority Data

Nov. 9, 2011    (JP) .................................. 2011-245860

(51) Int. Cl.
*G06F 3/0481* (2013.01)
*G06F 3/0338* (2013.01)

(52) U.S. Cl.
CPC .......... *G06F 3/04812* (2013.01); *G06F 3/0338* (2013.01)

(58) Field of Classification Search
CPC ....... G06F 3/0481; G06F 9/4443; G09G 5/14; G09G 2340/02; G09G 2340/12
See application file for complete search history.

(56) References Cited

U.S. PATENT DOCUMENTS

| | | | | |
|---|---|---|---|---|
| 5,821,926 | A * | 10/1998 | Arita | 715/744 |
| 2002/0021282 | A1 * | 2/2002 | Masudaya | 345/156 |
| 2004/0104887 | A1 * | 6/2004 | Tsukamoto et al. | 345/156 |
| 2004/0183779 | A1 | 9/2004 | Shibazaki et al. | |
| 2005/0259075 | A1 | 11/2005 | Ishikawa et al. | |
| 2006/0047374 | A1 * | 3/2006 | Hashimoto et al. | 701/1 |
| 2007/0220448 | A1 * | 9/2007 | Trewin | 715/856 |
| 2010/0005412 | A1 | 1/2010 | Tauchi et al. | |
| 2011/0035108 | A1 * | 2/2011 | Yamashita | 701/41 |
| 2011/0066343 | A1 * | 3/2011 | Ota et al. | 701/70 |

FOREIGN PATENT DOCUMENTS

| | | |
|---|---|---|
| JP | 5-221272 | 8/1993 |
| JP | 2004-287581 | 10/2004 |
| JP | 2005-332039 | 12/2005 |
| JP | 2007-302213 | 11/2007 |
| JP | 2009-301263 | 12/2009 |
| JP | 2010-012855 | 1/2010 |
| JP | 2010-097332 | 4/2010 |

OTHER PUBLICATIONS

Office action dated Nov. 12, 2013 in corresponding Japanese Application No. 2011-245860.

* cited by examiner

*Primary Examiner* — Boris Pesin
*Assistant Examiner* — Mandrita Brahmachari
(74) *Attorney, Agent, or Firm* — Harness, Dickey & Pierce, PLC

(57) ABSTRACT

A remote manipulation apparatus includes a main body and a manipulating handle manipulated by a user to move to cover all the orientations from a manipulation basis position defined on a basis of the main body. Movement of the manipulating handle relative to the manipulation basis position corresponds to movement of a pointer image relative to a screen basis position on a screen of a display apparatus. An auxiliary navigational display window includes a specified button image assigned with pointer-pulling information. When the auxiliary navigational display window appears on the screen, the manipulating handle is automatically driven to a position that corresponds to a position of the specified button image on the screen so that the pointer image is moved onto the specified button image that is assigned with the pointer-pulling information.

4 Claims, 9 Drawing Sheets

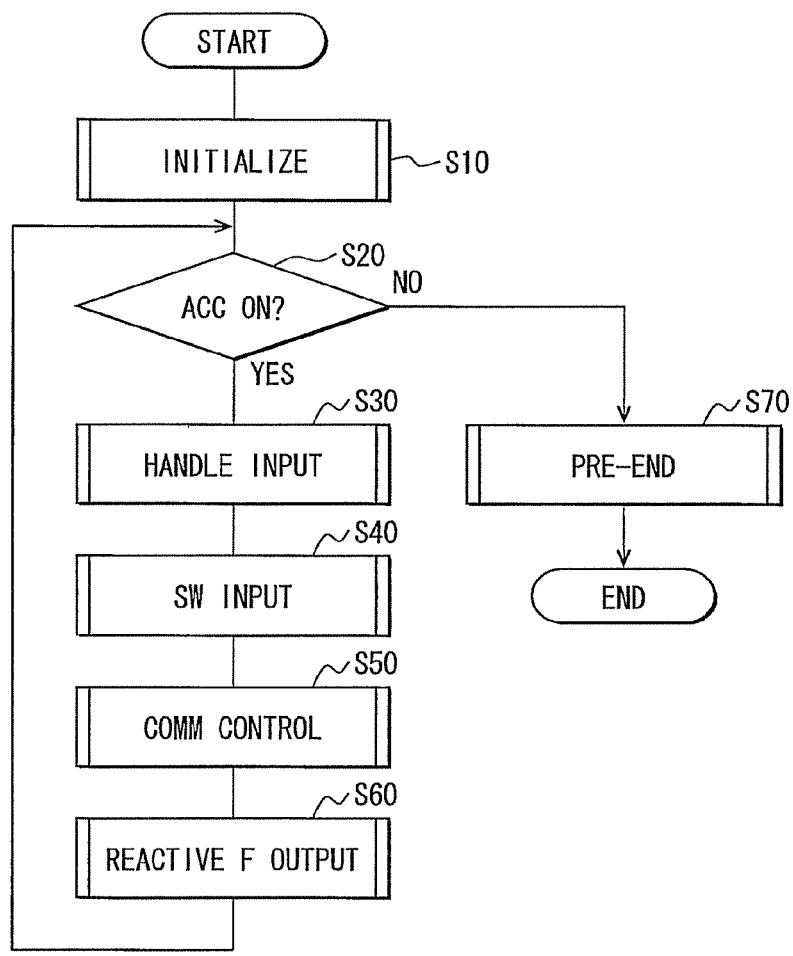

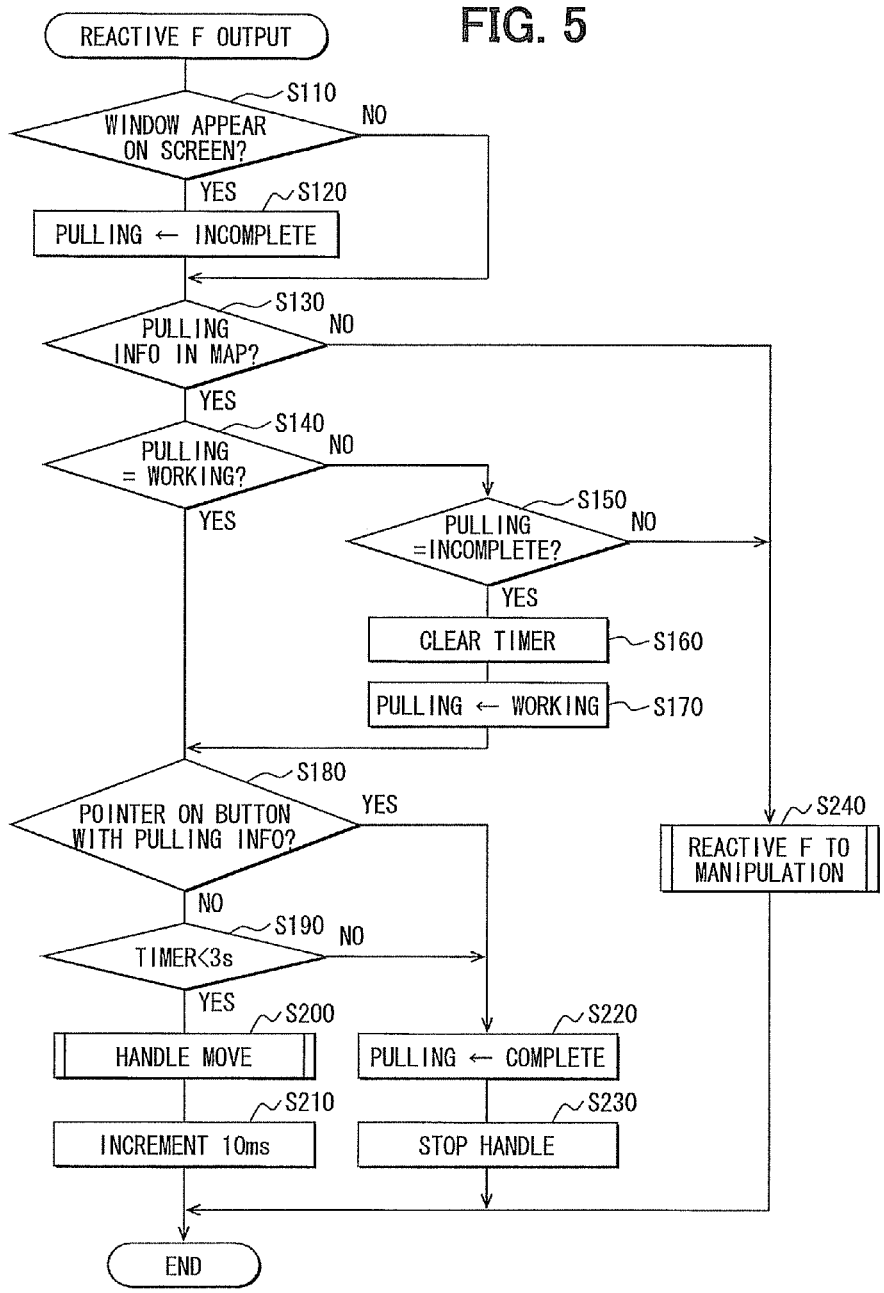

FIG. 6A
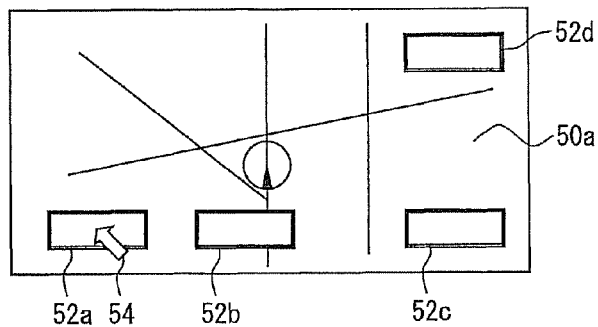
FIG. 6B
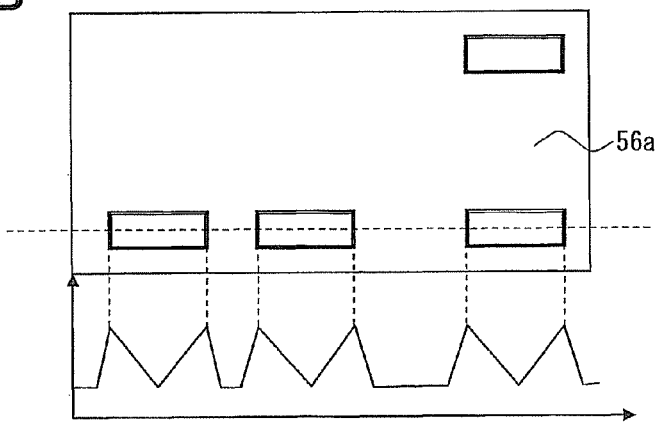
FIG. 6C
| | BUTTON (ID=1) | | | | |
|---|---|---|---|---|---|
| | No. | X | Y | WIDE | HIGH |
| 52a | 1 | 25 | 25 | 30 | 20 |
| 52b | 2 | 70 | 25 | 30 | 20 |
| 52c | 3 | 190 | 25 | 30 | 20 |
| 52d | 4 | 190 | 200 | 30 | 20 |

FIG. 7A
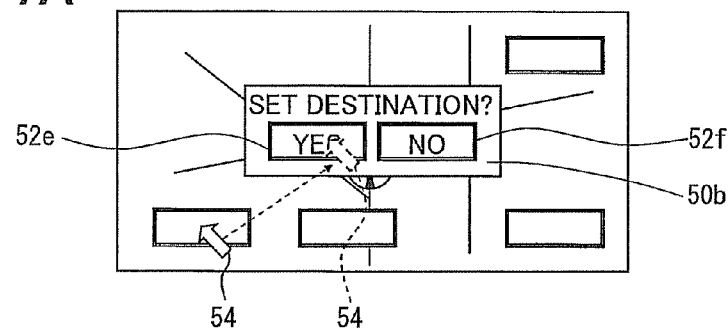
FIG. 7B
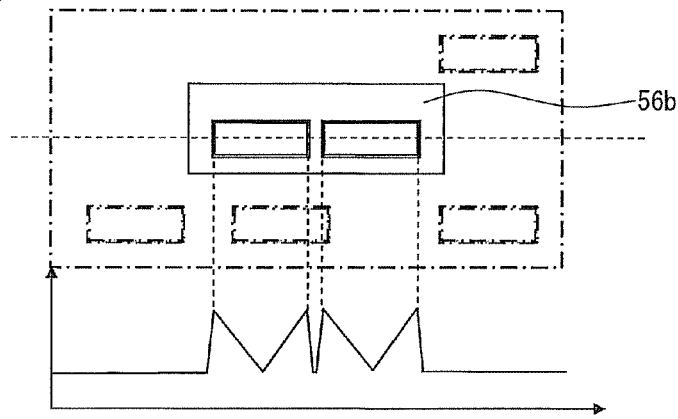
FIG. 7C
| BUTTON (ID=1) | | | | |
|---|---|---|---|---|
| No. | X | Y | WIDE | HIGH |
| 5 | 137 | 117 | 30 | 20 |
| PULLING BUTTON (ID=2) | | | | |
| 6 | 87 | 117 | 30 | 20 |

VEHICULAR MANIPULATION APPARATUS

CROSS REFERENCE TO RELATED APPLICATION

The present application is based on Japanese Patent Application No. 2011-245860 filed on Nov. 9, 2011, the disclosure of which is incorporated herein by reference.

TECHNICAL FIELD

The present disclosure relates to a vehicular manipulation apparatus.

BACKGROUND ART

Patent document 1: JP 05-221272 A

Patent document 1 discloses a vehicular manipulation apparatus that moves a pointer image on a screen of a display apparatus to select a button image for operating an in-vehicle apparatus.

The in-vehicle display apparatus displays a display window for a navigation apparatus or audio apparatus, for instance; such a display window includes button images for inputting a state or operation of an in-vehicle apparatus. The arrangement of individual button images may be designed variously.

The manipulation apparatus in Patent document 1 discloses only a configuration of moving and selecting the pointer image on the screen. Therefore, a user needs to look for the pointer image on the screen and move it to an intended button image each time a new display window appears, leading to an increase of the user's manipulation load.

SUMMARY

It is an object of the present disclosure to provide a vehicular manipulation apparatus to reduce a manipulation load for a manipulating portion by a user.

To achieve an above object, according to an aspect of the present disclosure, a vehicular manipulation apparatus is provided as follows. The vehicular manipulation apparatus displays a selector image and a display window on a screen of a display apparatus, the display window containing a button image to operate an in-vehicle apparatus. The vehicular manipulation apparatus moves the selector image to the button image to select the button image. The vehicular manipulation apparatus includes a main body, a manipulating portion, a detector, a display control section, a determination section, and a drive section. The manipulating portion is provided in the main body to be manipulated by a user to perform a movement to a manipulation position that is defined as a position relative to a manipulation basis position, the manipulation basis position being defined on a basis of the main body. The detector is to detect a detected direction and a detected magnitude of the movement of the manipulating portion. The display control section is to control a selector position of the selector image depending on the detected direction and the detected magnitude of the movement of the manipulating portion, the selector position being defined as a position on the screen relative to a screen basis position, the screen basis position being defined on a basis of the screen, the screen basis position corresponding to the manipulation basis position. The determination section is to determine whether the display window appearing on the screen contains a specified button image that is a button image assigned with selector-pulling information indicating pulling of the selector image. The drive section is to drive the manipulating portion to cause the manipulation position to correspond to a specified button position when it is determined that the display window appearing on the screen contains the specified button image, the specified button position being defined on the screen as a position of the specified button image relative to the screen basis position.

Under the above configuration, when the determination section determines that a display window displayed on the screen has a button image assigned with selector-pulling information, the drive section drives the manipulating portion to perform a movement to a position corresponding to the button image assigned with selector-pulling information. At this time, the selector image also moves on the screen depending on a direction and a magnitude of the movement of the manipulating portion. As a result, the selector image is moved to the button image assigned with the selector-pulling information.

Such automatic drive of the manipulating portion enables a user to recognize by a hand (i) the selector image moving to the button image with selector-pulling information and (ii) the position on the screen of the selector image. Thus, the manipulating portion and selector image are moved automatically to the button image assigned with selector-pulling information; the user can understand quickly the on-screen positions of the selector image and the button image assigned with selector-pulling information. For instance, if a button image having pulled the selector image is a button image desired by the user, the user may select the button image subsequently. If not, the user may intentionally manipulate the manipulating portion to move the selector image to an intended different button image. This may reduce a load of manipulating the manipulating portion by the user.

According to another aspect of the present disclosure, a vehicular manipulation apparatus is provided as follows. The vehicular manipulation apparatus displays a selector image and a display window on a screen of a display apparatus, the display window containing a button image to operate an in-vehicle apparatus. The vehicular manipulation apparatus moves the selector image to the button image to select the button image. The vehicular manipulation apparatus includes a manipulating portion, a detector, a display control section, and a drive section. The manipulating portion is to perform a movement relative to a manipulation basis position. The detector is to detect a detected direction and a detected magnitude of the movement of the manipulating portion relative to the manipulation basis position. The display control section is to control a selector position of the selector image depending on the detected direction and the detected magnitude of the movement of the manipulating portion. The drive section is to move the manipulating portion to a position that corresponds to a specified button image on the screen when the display window containing the specified button image appears on the screen, the specified button image being a button image assigned with selector-pulling information.

BRIEF DESCRIPTION OF THE DRAWINGS

The above and other objects, features, and advantages of the present disclosure will become more apparent from the following detailed description made with reference to the accompanying drawings. In the drawings:

FIG. 3A illustrates a relationship between (i) the pointer image on the screen and (ii) a screen basis position, and FIG. 3B illustrates a relationship between (i) the manipulating handle and (ii) a manipulation basis position;

FIG. 4 is a flowchart illustrating a main control process by a controller;

FIG. 5 is a flowchart illustrating a reactive force output process by the controller;

FIGS. 6A, 6B, 6C are diagrams for explaining a primary navigational display window on the screen and a reactive force map corresponding to the display window, FIG. 6A illustrates a display state of the primary navigational display window on the screen, FIG. 6B illustrates a reactive force map corresponding to the primary navigational display window, and FIG. 6C illustrates positional information of button images without selector-pulling information;

FIGS. 7A, 7B, 7C are diagrams for explaining an auxiliary navigational display window on the screen and a reactive force map corresponding to the display window, FIG. 7A illustrates a display state of the auxiliary navigational display window on the screen, FIG. 7B illustrates a reactive force map corresponding to the auxiliary navigational display window, and FIG. 7C illustrates positional information of button images with and without selector-pulling information;

DETAILED DESCRIPTION

The following describes embodiments of the present disclosure with reference to drawings. A component commonly provided in the embodiments is assigned with the same reference sign, eliminating repetition of explanation.

First Embodiment

Figure 3A:
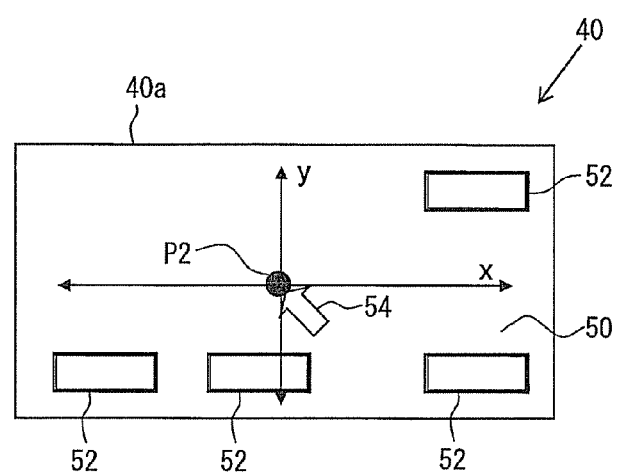
FIGS. 3A, 3B are diagrams for explaining a positional relationship between (i) a pointer image on a screen of a display apparatus and (ii) a manipulating handle of the remote manipulation apparatus.
Figure 3B:
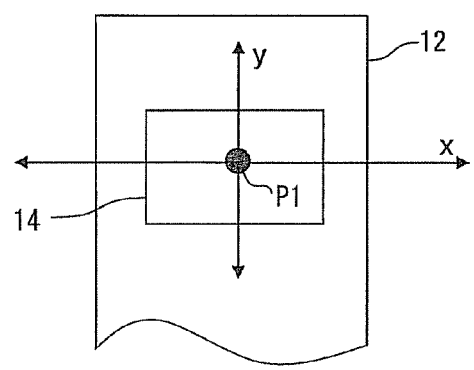

A remote manipulation apparatus 10 according to a first embodiment of the present disclosure is a vehicular manipulation apparatus mounted in a host vehicle that is a vehicle to which the apparatus 10 is mounted. The host vehicle may be also referred to as only "the vehicle," hereinafter. The apparatus 10 is manipulated by a user so as to move a pointer image 54 to a button image 52 in a display window 50 and select the button image 52. The display window 50 including the pointer image 54 and the button image 52 is displayed on a screen 40a of a display apparatus 40, as illustrated in FIG. 3A. The button image 52 in the display window 50 is an image for operating an in-vehicle apparatus. The pointer image 54 is an image for selecting the button image 52 and may be also referred to as a selector image.

Figure 1:
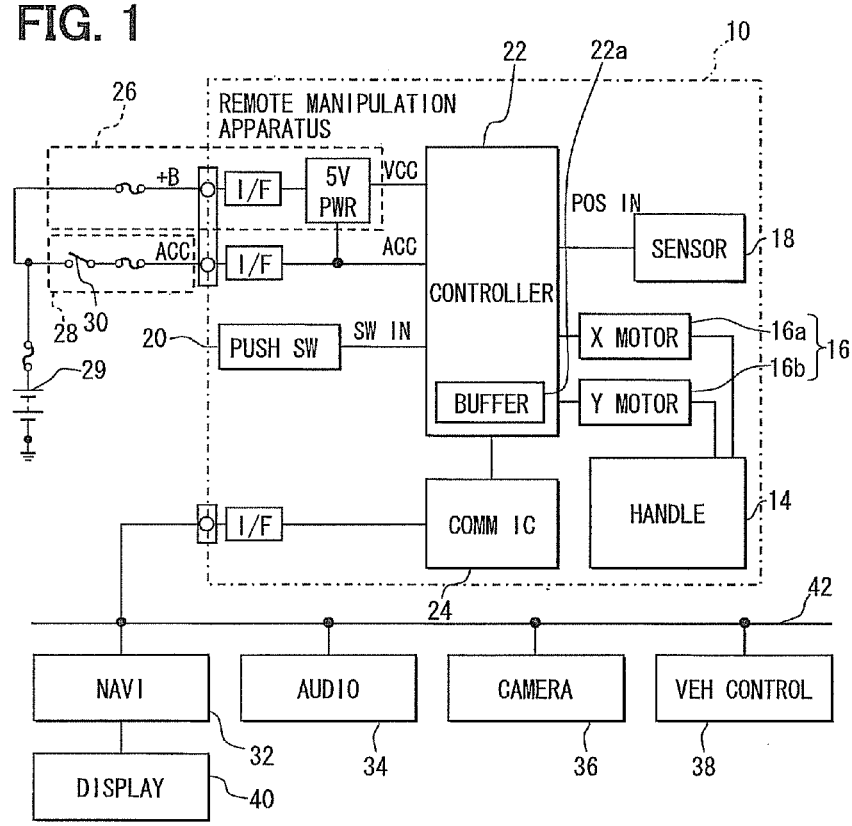
FIG. 1 is a block diagram for explaining a configuration of a remote manipulation apparatus according to a first embodiment of the present disclosure.

With reference to FIG. 1, the remote manipulation apparatus 10 is connected to a controller area network (CAN) 42. In addition, the CAN 42 is connected to a navigation apparatus 32, an audio apparatus 34, a back camera apparatus 36, and a vehicle control apparatus 38. The CAN 42 is an in-vehicle network system for realizing information communication between in-vehicle apparatuses using predetermined protocols.

The remote manipulation apparatus 10 outputs to the CAN 42 position information on a manipulating handle 14 and press information on a push switch 20, for example. The navigation apparatus 32 outputs to the CAN 42 information including a navigational display window as a display window 50, for example. The audio apparatus 34 outputs to the CAN 42 information including titles of CDs, for example. The back camera apparatus 36 outputs to the CAN 42 information including a back camera image of a region at the rear of the vehicle captured by a back camera, for example. The vehicle control apparatus 38 outputs to CAN 42 information including warning information of a fuel residual quantity and reversing information of a reverse state of a transmission, for example.

The navigation apparatus 32 detects a present position and heading direction of the vehicle based on information from (i) a global positioning system (GPS) receiver for positioning the present position and (ii) an electronic compass for measuring an orientation. The navigation apparatus 32 prepares a display window 50 which superimposes a symbol mark indicating the host vehicle on map data which the apparatus 32 is equipped with. The navigation apparatus 32 displays the display window 50 on the screen 40a in the display apparatus 40 connected to the apparatus 32. The display window 50 includes a navigational display window including button images 52 for setting a destination and a map scale, as illustrated in FIGS. 3A, 6A.

In addition, the navigation apparatus 32 acquires via the CAN 42 audio information, back camera image, and warning information, and prepares a display window 50 based on the information relative to the apparatus that the user selects among the apparatuses 32, 34, 36, 38 using the remote manipulation apparatus 10, displaying the display window 50 on the screen 40a. For example, when the navigation apparatus 32 is selected, the navigation apparatus 32 displays the navigational display window prepared as a display window 50 on the screen 40a. When the audio apparatus 34 is selected, the navigation apparatus 32 displays the audio information acquired as a display window 50 on the screen 40a. When the reverse information is received from the vehicle control apparatus 38, the navigation apparatus 32 displays the back camera image acquired as a display window 50 on the screen 40a. When the warning information of the fuel residual quantity is received from the vehicle control apparatus 38, the navigation apparatus 32 prepares warning display window based on the warning information acquired and displays the warning information acquired as a display window 50 on the screen 40a. It is noted that since the warning display window has urgency, the navigation apparatus 32 displays the warning display window to be superimposed on a display window that is presently displayed when receiving the warning information of the fuel residual quantity. Alternatively, the navigation apparatus 32 may switch to the warning display window by compulsorily replacing the display window presently displayed.

In addition, the navigation apparatus 32 outputs a display window data set, which includes data about the display window 50, to the CAN 42. The display window data set includes (i) button position information of a button image 52 that is information of a position on the screen 40a of the button image 52 contained in each display window 50; (ii) a magnitude of each button image 52; and (iii) selector-pulling information that is mentioned later. The selector-pulling information may be also referred to as pointer-pulling information. The display window data set outputted to the CAN 42 is acquired by the remote manipulation apparatus 10.

The audio apparatus 34 is an in-vehicle apparatus mounted in the vehicle. The apparatus 34 reproduces the content data of music and video stored in a storage such as a hard disk drive, flash memory, and optical disk like CD (registered trademark) and DVD (registered trademark). The audio apparatus 34 outputs audio information regarding a song presently reproduced to the navigation apparatus 32 via the CAN 42. The audio information includes a song name, artist name, and album name of the song.

The back camera apparatus 36 is an in-vehicle apparatus mounted in the vehicle, and has a camera as an image sensor which captures an image of a region in the rear of the vehicle. The camera may adopt a CCD camera, for example. The back camera apparatus 36 starts to operate by detecting that the transmission was reversed by the user, and outputs a camera image of a region in the rear of the vehicle captured by the camera to the navigation apparatus 32 via the CAN 42.

The vehicle control apparatus 38 controls a power train such as an engine and transmission mounted in the vehicle. The vehicle control apparatus 38 acquires information required to control the vehicle, such as an engine speed, vehicle speed, and fuel residual quantity via the CAN 42, controlling the power train. In addition, the vehicle control apparatus 38 outputs warning information based on the fuel residual quantity acquired, to the navigation apparatus 32. Furthermore, the vehicle control apparatus 38 outputs the reverse information which indicates the reverse state to the CAN 42 when the transmission is in the reverse state.

The following will explain the remote manipulation apparatus 10 with reference to FIGS. 1, 2, 3A, 3B. The remote manipulation apparatus 10 is a vehicular manipulation apparatus, which is disposed in a center console of the vehicle and manipulated by a user in the vehicle such as a driver. The remote manipulation apparatus 10 receives an input of manipulation by the user and transmits a magnitude of a manipulation variation to the navigation apparatus 32 via the CAN 42, moving the pointer image 54 displayed on the screen 40a (refer to FIG. 3A). When the pointer image 54 is overlapped on the button image 52, the remote manipulation apparatus 10 produces a reactive force to manipulation, in order to inform the user of the pointer image 54 being overlapped on the button image 52.

Figure 2:
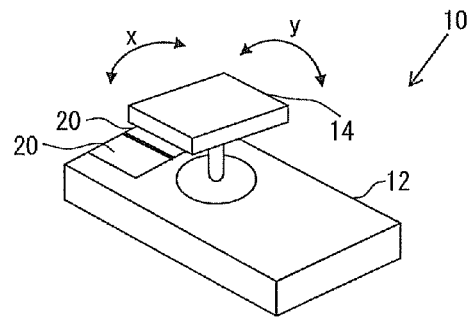
FIG. 2 is an outside view of the remote manipulation apparatus.

As illustrated in FIG. 2, the remote manipulation apparatus 10 includes a main body 12 accommodated in the center console of the vehicle. The main body 12 supports or contains a controller 22; a sensor portion 18 for detecting a position of the manipulating handle 14; and a biasing portion 16 including a x-axis motor 16a and y-axis motor 16b to provide a reactive force to the manipulating handle 14. The manipulating handle 14 has a manipulation basis position P1 defined on a basis of or relative to the main body 12, and moves to cover all the orientations from the manipulation basis position P1 (refer to FIG. 3B). Specifically, the manipulating handle 14 inclines against the main body 12. In addition, the remote manipulation apparatus 10 has two push switches 20 in the main body 12 of the center console. The push switches 20 are arranged in the main body 12 in an area anterior to the manipulating handle 14 in the vehicle-heading direction.

The position on the screen of the pointer image 54 displayed moves in cooperation with the manipulation of the manipulating handle 14 by the user. A position on the screen 40a may be also referred to as an on-screen position, hereinafter. A screen basis position P2 is designated at a center of the screen 40a and is used as a basis position of the pointer image 54, as illustrated in FIG. 3A. The screen basis position P2 one-to-one corresponds to the manipulation basis position P1; when the manipulating handle 14 is located at the manipulation basis position P1 in the main body 12, the pointer image 54 is displayed on the screen basis position P2. The pointer image 54 moves from the screen basis position P2 on the screen 40a depending on a direction and a magnitude of a movement of the manipulating handle 14 from the manipulation basis position P1. That is, a position of the manipulating handle 14 relative to the manipulation basis position P1 corresponds to an on-screen position of the pointer image 54 relative to the screen basis position P2.

In addition, as mentioned above, the manipulating handle 14 is movable to cover all the orientations from the manipulation basis position P1. Therefore, the manipulation of the manipulating handle 14 enables an on-screen movement of the pointer image 54 over all the orientations on the screen 40a from the screen basis position P2. Furthermore, the screen basis position P2 is designated at a center of the screen 40a, for instance. Therefore, the pointer image 54 can be moved to all the corners of the screen 40a by the manipulation of the manipulating handle 14 from the manipulation basis position P1 to all the orientations.

With reference to FIG. 2, with respect to the remote manipulation apparatus 10, the x direction is along a vehicle-width direction (i.e., a vehicle-lateral direction) and the y direction is along a vehicle-back-and-forth direction (a vehicle-longitudinal direction). In contrast, with reference to FIG. 3A, with respect to the screen 40a, the x direction (i.e., x axis) is along a lateral direction on the screen 40a and the y direction (i.e., y axis) is along a longitudinal direction on the screen 40a.

The push switch 20 is located near the manipulating handle 14 to be pressed by the user. Overlapping the pointer image 54 on a button image on the screen 40a results in the button image 52 moving into a selectable state. The user presses the push switch 20 in the selectable state, enabling an operation associated with the button image 52 to be executed by a corresponding in-vehicle apparatus.

The controller 22 mainly includes a microcomputer having a CPU, ROM, RAM, and backup RAM to execute various kinds of control programs stored in the ROM to execute processes. The RAM contains a buffer 22 as a data area to store a display window data set acquired via the CAN 42.

The controller 22 is electrically connected with a constant power supply circuit 26 and an accessory power supply circuit 28. The constant power supply circuit 26 connects the controller 22 to a battery 29, and supplies a power source (5V) constantly from the battery 29 to the controller 22. The accessory power supply circuit 28 connects the controller 22 to the battery 29 via the accessory switch 30, and supplies an accessory power source to the controller 22 by turning on the accessory switch 30.

In addition, the controller 22 is connected with the biasing portion 16 that provides a reactive force to a manipulation of a user when the pointer image 54 overlaps on a button image 52. The biasing portion 16 includes an x-axis motor 16a to provide a reactive force to the manipulating handle 14 along the x direction, and a y-axis motor 16b to provide a reactive force to the manipulating handle 14 along the y direction. The rotation axis of the x-axis motor 16a is indirectly connected with the manipulating handle 14 via a gear etc.; the rotation axis of the y-axis motor 16b is indirectly connected with the manipulating handle 14 via a gear etc. The x-axis motor 16a and y-axis motor 16b rotate the rotation axes based on drive signals from the controller 22, respectively. As the rotation axis of the x-axis motor 16a rotates, the manipulating handle 14 moves along the x direction; as the rotation axis of the y-axis motor 16b rotates, the manipulating handle 14 moves along the y direction. Further, when the user manipulates the manipulating handle 14, the rotation axes of the x-axis motor 16a and the y-axis motor 16b rotate depending on a movement of the manipulating handle 14 in the x direction and the y direction, respectively. When the force of the user's manipulation is thereafter released, the rotation of the rotation axis of each of the x-axis motor 16a and the y-axis motor 16b stops with the manipulating handle 14 supported in the main body 12 to be kept at a released position. Again, when the user applies a force to the manipulating handle 14, the manipulating handle 14 starts to move in proportion to the force of the manipulation.

In addition, the sensor portion 18 is provided to detect rotation angles of the rotation axes of the x-axis motor 16a and the y-axis motor 16b. The sensor portion 18 transmits the rotation angles detected from the motors 16a, 16b to the controller 22. The sensor portion 18 includes a rotary encoder, for example. The controller 22 obtains a position of the manipulating handle 14 relative to the manipulation basis position P1 based on the rotation angles of the motors 16a, 16b from the sensor portion 18, and sends the position obtained to the communication IC 24.

The communication IC 24 acquires information necessary for the remote manipulation apparatus 10 via the CAN 42 and transmits the information acquired to the controller 22. The IC 24 further outputs the position information of the manipulating handle 14 relative to the manipulation basis position P1 and the press information of the push switch 20 to the CAN 42 in order to move the pointer image 54. The information acquired by the communication IC 24 and necessary for the remote manipulation apparatus 10 include (i) a display window data set about a display window 50 displayed by the navigation apparatus 32 on the screen 40a and (ii) display information to indicate which display window data set is presently displayed on the screen 40a among the display window data sets acquired.

The following will explain the display window data set which the communication IC 24 acquires with reference to FIGS. 6A, 6B, 6C and FIGS. 7A, 7B, 7C. Two display windows 50 selected by the navigation apparatus 32 with a high display possibility will be explained in detail. The two display windows 50 are a primary navigational display window 50a and an auxiliary navigational display window 50b.

With reference to FIG. 6A, the primary navigational display window 50a includes mainly a map image to indicate a present position of the vehicle. The primary navigational display window 50a further includes information such as a present position, heading direction, and required time to reach a destination, and, further includes a plurality of button images 52a to 52d. For instance, a map image is scrolled and the pointer image 54 is overlapped on a button image 52a according to the manipulation of the manipulating handle 14. While the pointer image 54 is overlapped on the button image 52, a manipulation of pressing the push switch 20 is inputted to the remote manipulation apparatus 10. In such a case, the navigation apparatus 32 executes a process such as a destination designation to designate as a destination a place to which the vehicle position mark points out.

This primary navigational display window 50a includes (i) button position information of positions of the button images 52a to 52d on the screen 40a; and (ii) size information of sizes or magnitudes of the button images 52a to 52d. The information is outputted to the CAN 42 as a display window data set of the primary navigational display window 50a from the navigation apparatus 32, being acquired by the communication IC 24. It is noted that the display window data set of the primary navigational display window 50a does not include selector-pulling information. The selector-pulling information is used for automatically pulling the pointer image 54 to a specified button image 52a when the primary navigational display window 50a is displayed or appears on the screen 40a.

With reference to FIG. 7A, the auxiliary navigational display window 50b is a window for confirmation when the navigation apparatus 32 executes a destination designation; the auxiliary navigational display window 50b is superimposed over the primary navigational display window 50a. The auxiliary navigational display window 50b displays a message "SET DESTINATION" for setting as a destination a place selected from map or destination list. The auxiliary navigational display window 50b includes a button image 52a of "YES" and a button image 52f of "NO." The navigation apparatus 32 designates the selected place as a destination when a determination input is applied to the remote manipulation apparatus 10. Applying the determination input is achieved by pressing the push switch 20 when the pointer image 54 is overlapped on the button image 52e using the manipulating handle 14, for instance.

The auxiliary navigational display window 50b includes (i) button position information of positions of the button images 52e, 52f on the screen 40a; and (ii) a magnitude of each button image 52e, 52f; and (iii) selector-pulling information. In the present embodiment, the selector-pulling information is assigned to a specified button image that is the button image 52e in the auxiliary navigational display window 50b whereas the selector-pulling information is not assigned to a non-specified button image that is the button image 52f in the auxiliary navigational display window 50b. The information included in the auxiliary navigational display window 50b is outputted to the CAN 42 as a display window data set of the auxiliary navigational display window 50b from the navigation apparatus 32, being acquired by the communication IC 24.

The controller 22 prepares reactive force maps 56a, 56b in FIGS. 6B, 7B based on the display window data sets acquired via the communication IC 24. The reactive force maps 56a, 56b are prepared for the display window data sets, respectively, as indicated in FIGS. 6B, 7B. When the pointer image 54 moves across an outline portion of each button image 52a to 52f, a reactive force to manipulation is given to the manipulating handle 14 according to the reactive force map 56a, 56b. The reactive force maps 56a, 56b are stored in the buffer 22a in the controller 22. The buffer 22a can store three reactive force maps. In addition, when the selector-pulling information is included in the display window data set, the selector-pulling information is given to a specified button image of the reactive force map. In the present embodiment, the selector-pulling information is given to the button image 52e as the specified button image in FIG. 7A.

The following will explain a reactive force to manipulation with reference to FIG. 6B. The graph in the lower row in FIG. 6B illustrates the reaction force for manipulation given to the manipulating handle 14 when the pointer image 54 moves along the broken line extended in the lateral direction along the x direction of the screen 40a. The reactive force becomes strong as the pointer image 54 approaches any button image 52a to 52d. It becomes a maximum when the pointer image 54 is in the outlined line of the button image 52a to 52d. It becomes weak as the pointer image 54 approaches a center in the outline portion of the button image 52a to 52d.

The controller 22 also acquires the display information via the communication IC 24; the display information indicates which or what kind of display window is currently displayed on the screen 40a. The controller 22 selects a reactive force map corresponding to the display window currently displayed on the screen 40a based on the window information acquired. For example, when the primary navigational display window 50a in FIG. 6A is presently displayed on the screen 40a, the controller 22 selects the reactive force map 56a.

For instance, the manipulating handle 14 is manipulated by the user in the state of FIG. 6A; the rotation axes of the x-axis motor 16a and the y-axis motor 16b rotate in proportion to the movement of the manipulating handle 14. The sensor portion 18 detects the rotation angles of the rotation axes of the motors 16a, 16b and outputs them to the controller 22. The controller 22 obtains the position of manipulating handle 14 relative to the manipulation basis position P1 based on the detection result from the sensor portion 18, and outputs the position information of the manipulating handle 14 to the CAN 42.

The navigation apparatus 32 acquires the position information of the manipulating handle 14 from the remote manipulation apparatus 10, moving the pointer image 54 on the screen 40a based on the position information acquired, as illustrated in FIG. 6A. Specifically, an on-screen position of the pointer image 54 relative to the screen basis position P2 is determined in proportion to the direction and magnitude of the movement of the manipulating handle 14 from the manipulation basis position P1; the pointer image 54 is displayed on the on-screen position determined. The manipulating handle 14 reaches a position in the reactive force map 56a corresponding to any button image 52a to 52d; the controller 22 outputs drive signals to the individual motors 16a, 16b so as to provide the reactive force to manipulation in FIG. 6B to the manipulating handle 14. Thereby, the reactive force to manipulation is given to the manipulating handle 14; the user may recognize via the hand that the pointer image 54 is overlapped on the button image 52a to 52d. At this time, the pointer image 54 is overlapped on the button image 52a to 52d on the screen 40a.

Further, the navigation apparatus 32 switches the display window displayed on the screen 40a from the primary navigational display window 50a in FIG. 6A to the auxiliary navigational display window 50b in FIG. 7A; the navigation apparatus 32 outputs the window information about the auxiliary navigational display window 50b to the CAN 42. The controller 22 acquires the window information outputted, selecting the reactive force map 56b. As explained above, the selector-pulling information is assigned to the button image 52e in the reactive force map 56b. This is illustrated as "PULLING BUTTON" in FIG. 7C.

The controller 22 drives the manipulating handle 14 based on the reactive force map 56b assigned with the selector-pulling information, moving the manipulating handle 14 relative to the main body 12 until the pointer image 54 reaches the position of the button image 52e assigned with the selector-pulling information in the reactive force map 56b. Specifically, the controller 22 outputs the drive signals to the x-axis motor 16a and the y-axis motor 16b to execute the drive control of the individual motors 16a, 16b such that the position of the manipulating handle 14 relative to the manipulation basis position P1 corresponds to the on-screen position of the button image 52e assigned with the selector-pulling information relative to the screen basis position P2.

Thus, the manipulating handle 14 is moved to the position corresponding to the button image 52e assigned with the selector-pulling information indicated in the reactive force map 56b. At this time, the controller 22 obtains the position of the manipulating handle 14 relative to the manipulation basis position P1 based on the detection result from the sensor portion 18, outputting the position information of the manipulating handle 14 to the CAN 42. The navigation apparatus 32 thereby moves the pointer image 54 based on the position information acquired. As a result, the pointer image 54 is moved over to the button image 52e assigned with the selector-pulling information.

Thus, moving of the manipulating handle 14 and the pointer image 54 cooperatively leads to the user's recognition of the movement of the pointer image 54 to the button image 52e assigned with the selector-pulling information and the on-screen position of the pointer image 54, via the hand. The manipulating handle 14 and the pointer image 54 move automatically to the respective positions corresponding to or associated with the button image 52e assigned with the selector-pulling information. The user may thus understand quickly the on-screen position of the button image 52e pulling the pointer image 54. For example, when the button image 52e is an intended one, the user may just select the button image 52e by pressing the push switch 20. In contrast, when being an unintended one, the user may manipulate the manipulating handle 14 to move the pointer image 54 to another on-screen position. The load for manipulation the manipulating handle 14 by the user may be eventually reduced.

The following will explain an operation of the manipulating handle 14 in the remote manipulation apparatus 10 with reference to FIGS. 4, 5. The control processes in FIGS. 4, 5 are repeatedly executed when an accessory (ACC) switch is under an ON state. It is further noted that a flowchart in the present application includes sections (also referred to as steps), which are represented, for instance, as S10. Further, each section can be divided into several sub-sections while several sections can be combined into a single section. Furthermore, each of thus configured sections can be referred to as a device, module, processor, or means and achieved not only (i) as a software section in combination with a hardware unit (e.g., computer), but also (ii) as a hardware section, including or not including a function of a related apparatus. Further, the hardware section may be inside of a microcomputer.

At S10, an initialization processing is performed at a start-up. At S20, it is determined whether the ACC is in the ON state. When the ACC is in the ON state, the processing proceeds to S30. When the ACC is not in the ON state, the processing proceeds to S70.

At S30, a manipulating handle input process is executed. In the manipulating handle input process, the controller 22 detects a position of the manipulating handle 14 relative to the manipulation basis position P1 based on the detection result from the sensor portion 18; the controller 22 then stores the position detected as present handle position information in a storage of the controller 22. The controller 22 calculates a displacement quantity between the present handle position information and the previous handle position information that was stored in the previous manipulation handle input process. Furthermore, the controller 22 detects the present handle position information based on the displacement quantity calculated and substitutes the information detected with the previous handle position information that was detected in the previous manipulating handle input process and stored.

At S40, a switch input process is executed. In the switch input process, the controller 22 determines whether the push switch 20 is pressed. When the push switch 20 is pressed, the controller 22 stores a press record that the push switch 20 is pressed in the storage of the controller 22. When the push switch 20 is not pressed, the controller 22 ends the process and returns to the main process.

At S50, a communication control process is executed. In the communication control process, the controller 22 controls the communication IC 24 to acquire a display window data set outputted from the navigation apparatus 32. The controller 22 stores the reactive force map in the buffer 22a based on the display window data set (refer to FIGS. 6B, 7B). The controller 22 controls the communication IC 24 to output the handle position information of the manipulating handle 14 and the press information of the push switch 20, which were detected and stored at S30 and S40, respectively, to the navigation apparatus 32.

In the present embodiment, the reactive force maps 56a, 56b stored in the buffer 22a are indicated in FIGS. 6B, 7B, respectively. In addition, in the communication control process, the controller 22 acquires the window information about the display window currently displayed on the screen 40a via the communication IC 24. The display information acquired indicates whether the display window currently displayed on the screen 40a is the primary navigational display window 50a or the auxiliary navigational display window 50b.

At S60, a reactive force output process is executed. In the reactive force output process, in cases that the selector-pulling information is not assigned to the reactive force map corresponding to the display window displayed on the screen 40a, the controller 22 gives the reactive force to manipulation to the manipulating handle 14 when the pointer image 54 is overlapped on the button image. This case corresponds to FIGS. 6A, 6B. When the pointer image 54 is overlapped on the button image 52a to 52d, the controller 22 outputs the individual drive signals to the x-axis motor 16a and the y-axis motor 16b and provides the reactive force to manipulation to the manipulating handle 14 based on the reactive force map 56a.

Whether the above selector-pulling information is assigned or not is stored in the storage of the controller 22 as a table illustrated in FIG. 6C, together with the button position information of the button images on the screen 40a. It is noted that "ID=1" signifies that the selector-pulling information is not assigned to the button images 52a, 52b, 52c, and 52d.

In contrast, in cases that the selector-pulling information is assigned to the reactive force map corresponding to the display window displayed on the screen 40a, the controller 22 drives the manipulating handle 14 to enable the position of the manipulating handle 14 relative to the manipulation basis position P1 to correspond to the on-screen position of the button image 52e with the selector-pulling information relative to the screen basis position P2. This case corresponds to FIGS. 7A, 7B. The controller 22 outputs the drive signals to the rotation axes of the x-axis motor 16a and the y-axis motor 16b to drive the manipulating handle 14, enabling the position of the manipulating handle 14 relative to the manipulation basis position P1 to correspond to the on-screen position of the button image 52e with the selector-pulling information relative to the screen basis position P2.

FIG. 7C indicates a table stored in the controller 22. The button image 52e with the selector-pulling information is assigned with "ID=2," distinguishing from the button image 52f without the selector-pulling information that is assigned with "ID=1." In the present embodiment, the determination as to whether each button image is assigned with the selector-pulling information is executed when the determination input is made by the user to switch over to the next display window. That is, each time the window switchover arises by the determination input, it is determined whether a button image assigned with the selector-pulling information is included in the next display window. When the button image with the selector-pulling information is included, the controller 22 moves the manipulating handle 14 compulsorily to the position corresponding to the button image with the selector-pulling information. It is noted that the selector-pulling information is assigned to a button image that has a high probability for the user to select after the window switchover.

After S60, the processing returns to S20. The processing at S30 to S60 is repeatedly executed until the ACC is no longer in the ON state. Under the repetition of S30 to S60, the primary navigational display window 50a in FIG. 6A appears on the screen 40a. The pointer image 54 thereby moves on the screen 40a based on the position of the manipulating handle 14 relative to the manipulation basis position P1. When the pointer image 54 is overlapped on the button image 52a to 52d, the reactive force to manipulation is given to the manipulating handle 14. Thereafter, the auxiliary navigational display window 50b in FIG. 7A appears on the screen 40a. The controller 22 thereby drives the manipulating handle 14 to enable the position of the manipulating handle 14 relative to the manipulation basis position P1 to correspond to the on-screen position of the button image 52e with the selector-pulling information relative to the screen basis position P2. Due to the drive, the pointer image 54 moves over to the button image 52e and stops the movement at the position to overlap on the button image 52e.

Under the repetition of S30 to S60, when the ACC becomes no longer in the ON state, the processing proceeds to S70. At S70, a pre-end process is executed and the main process is then ended.

The reactive force output process at S60 will be explained with reference to FIG. 5. At S110, it is determined whether the display window currently displayed on the screen 40a appears or is displayed newly after the previous reactive force output process was executed. Specifically, it is determined whether new window information was obtained at S50 of the main process in FIG. 4. When it is determined that the display window on the screen 40a appears newly, the processing proceeds to S120. When it is determined that the display window on the screen 40a did not appear newly, the processing proceeds to S130. Further, when a display window appears for the first time after the main process starts, it is determined that the display window on the screen 40a appears newly, the processing proceeds to S120.

At S120, a status of a pulling operation is set to an incomplete mode. The pulling operation is to pull the manipulating handle 14 to a position corresponding to an on-screen position of the button image with the selector-pulling information relative. The status of the pulling operation includes a complete mode, an incomplete mode, and a working mode.

At S130, it is determined whether the selector-pulling information is include in the reactive force map corresponding to the display window displayed on the screen 40a. When the primary navigational display window 50a is displayed on the screen 40a, the processing proceeds to S240. When the auxiliary navigational display window 50b is displayed on the screen 40a, the processing proceeds to S140.

At S140, it is determined whether the status of the pulling operation is in the working mode. Under the repetition of S20 to S60, as long as S170 is not executed after the display window appears newly on the screen 40a by replacing a display window previously displayed, it is determined that the status of the pulling operation is not in the working mode, advancing the processing to S150. For example, the primary navigational display window 50a is switched to the auxiliary navigational display window 50b, executing S140 for the first time. In such a case, the status of the pulling operation is set in the incomplete mode, advancing the processing to S150.

Under the repetition of S20 to S60, in the cases that (i) the same display window is displayed on the screen 40a unchanged, (ii) S170 is executed once, and (iii) the pulling operation of the manipulating handle 14 is not completed, it is determined that the status of the pulling operation is under the working mode, advancing the processing to S180. For example, in cases that the manipulating handle 14 is being manipulated in the state where the auxiliary navigational display window 50b is displayed on the screen 40a, the status of the pulling operation is under the working mode, advancing the processing to S180.

At S150, it is determined whether the status of the pulling operation is under the incomplete mode. When the status of the pulling operation is under the complete mode, advancing the processing to S240. In contrast, when the status of the pulling operation is under the incomplete mode, advancing the processing to S160.

At S160, a timer of the pulling operation is cleared, advancing the processing to S170. At S170, the status of the pulling operation is set to the working mode. The processing then proceeds to S180.

Further, at S180, it is determined whether the position of the manipulating handle 14 relative to the main body 12 corresponds to the on-screen position of the button image with the selector-pulling information relative to the screen basis position P2. For instance, suppose that the display window currently displayed on the screen 40a is the auxiliary navigational display window 50b. It is determined whether the position of the manipulating handle 14 relative to the manipulation basis position P1 corresponds to the on-screen position of the button image 52e with the selector-pulling information relative to the screen basis position P2 in the auxiliary navigational display window 50b. Specifically, it is determined whether the position of the manipulating handle 14 relative to the manipulation basis position P1 corresponds to the on-screen position of the outline portion of the button image 52e relative to the screen basis position P2. When it is determined that the position of the manipulating handle 14 relative to the manipulation basis position P1 does not correspond to the on-screen position of the button image 52e with the selector-pulling information relative to the screen basis position P2, the processing proceeds to S190. When it is determined that the position of the manipulating handle 14 relative to the manipulation basis position P1 corresponds to the on-screen position of the button image 52e with the selector-pulling information relative to the screen basis position P2, the processing proceeds to S220 where the status of the pulling operation is set to the complete mode. At S230, the output of the drive signals to the x-axis motor 16a and the y-axis motor 16b is stopped, and the reactive force output process is ended.

At S190, it is determined whether the timer for the pulling operation is less than 3 seconds. When the timer is less than 3 seconds, the processing proceeds to S200. When the timer is not less than 3 seconds, the processing proceeds to S220.

At S200, a manipulating handle movement process is executed. The manipulating handle movement process is to enable the position of the manipulating handle 14 relative to the main body 12 to correspond to the on-screen position of the button image with the selector-pulling information relative to the screen basis position P2. The controller 22 calculates the displacement quantity of the manipulating handle 14 based on the handle position information of the manipulating handle 14 outputted to the CAN 42 at S50 of the main process and the button position information of the button image 52e with the selector-pulling information in the reactive force map 56b of the auxiliary navigational display window 50b being selected. The controller 22 outputs the drive signals to the x-axis motor 16a and the y-axis motor 16b based on the displacement quantity calculated. Thereby, the manipulating handle 14 begins to move toward the position corresponding to the button image 52e with the selector-pulling information.

At S210, a predetermined time is added to the timer of the pulling operation. The predetermined time added may be just three seconds or less. The present embodiment adopts ten (10) milliseconds, for instance. After S210 is executed, the reactive force output process is ended.

Herein, the reactive force to manipulation at S240 is executed when the selector-pulling information is not included in the reactive force map selected at S130, or when the status of the pulling operation is under the complete mode. At S240, the reactive force to manipulation is provided to the manipulating handle 14 in proportion to the handle position information of the manipulating handle 14 outputted to the CAN 42 in the communication control process at S50 using the reactive force map selected now. For example, when the manipulating handle 14 is located in a region where the reactive force to manipulation is not provided in the reactive force map, the reactive force to manipulation is not given to manipulating handle 14. In addition, in the reactive force map, the manipulating handle 14 approaches a button image and enters a region where the reactive force to manipulation is provided. The manipulating handle 14 is thereby provided with the reactive force to manipulation in proportion to the force specified in the reactive force map.

According to the present embodiment explained above, the pointer image 54 displayed on the screen 40a is moved by the user using the manipulating handle 14. Further, the on-screen position of the pointer image 54 relative to the screen basis position P2 corresponds to the position of the manipulating handle 14 relative to the manipulation basis position P1. In addition, it is determined that the primary navigational display window 50a is switched into the auxiliary navigational display window 50b including the button image 52e with the pulling operation information. The controller 22 thereby drives the manipulating handle 14 using the x-axis motor 16a and the y-axis motor 16b to enable the position of the manipulating handle 14 relative to the manipulation basis position P1 to correspond to the on-screen position of the button image 52e with the selector-pulling information relative to the screen basis position P2. The user is thereby enabled to recognize via the hand that the pointer image 54 moves onto the button image 52e with the selector-pulling information automatically.

Further, in the present embodiment, the manipulating handle 14 is moved automatically to the position corresponding to the button image 52e with the selector-pulling information, as shown in FIGS. 7A, 7C. In the middle of the automatic movement of the manipulating handle 14, the user may apply a force to the manipulating handle 14, holding the manipulating handle 14 not to move. In such a case, the user is assumed not to desire an operation of the button image 52e the pointer image 54 approaches.

To that end, in the present embodiment, the drive of the manipulating handle 14 may be stopped when a predetermined time such as three seconds passes during driving of the x-axis motor 16a and the y-axis motor 16b to move the manipulating handle 14 over to the position corresponding to the button image 52e ever when the position of the manipulating handle 14 relative to the manipulation basis position P1 does not reach the position correspond to the on-screen position of the button image 52e with the selector-pulling information relative to the screen basis position P2. The above configuration may reflect the intention of the user not to desire the automatic movement of the pointer image 54 to the button image 52e with the selector-pulling information. In addition, the power consumption due to the x-axis motor 16a and the y-axis motor 16b continuing driving may also be suppressed as much as possible.

In the present embodiment, the manipulating handle 14 may be also referred to as a manipulating portion. The sensor portion 18 may be referred to as a detector. The controller 22 executing S30 and S60 may be referred to as a display control section, device, or means. The controller 22 executing S130 may be referred to as a determination section, device, or means. The controller 22 executing S200 using the x-axis motor 16a and the y-axis motor 16b may be also referred to as a drive section, device, or means. The controller 22 executing S190 and S230 may be referred to as a stop section, device, or means.

Second Embodiment

In the first embodiment, when the selector-pulling information is contained in the display window data set of a display window which is newly displayed, the manipulating handle 14 is driven to the position corresponding to the position of the button image assigned with the selector-pulling information.

In contrast, suppose the following case. The pointer image 54 is moved to a button image assigned with the selector-pulling information in a display window. After the user performs an operation corresponding to the button image, the same display window containing the same button image is displayed again on the screen 40a. The operation corresponding to the button image is completed in the previous display of the display window; thus, the user may not desire the automatic drive of the manipulating handle 14 and the automatic movement of the pointer image 54. Under the above first embodiment, each time the display window containing the same button image the manipulation of which has been already completed is displayed, the drive of the manipulating handle 14 and the movement of the pointer image 54 are performed repeatedly. This may give the user a feeling troublesome against the automatic drive of the manipulating handle 14 and the automatic movement of the pointer image 54.

To that end, the second embodiment is provided with a configuration additional to that of the first embodiment. That is, the controller 22 determines whether the number of pulling operations of the manipulating handle 14 is equal to or greater than a predetermined value with respect to a specified display window containing a button image assigned with the selector-pulling information. When it is determined that the number of pulling operations of the manipulating handle 14 is equal to or greater than a predetermined value, the controller 22 prohibits a next pulling operation of the manipulating handle 14 in the same specified display window containing the same button image assigned with the selector-pulling information.

Figure 9:
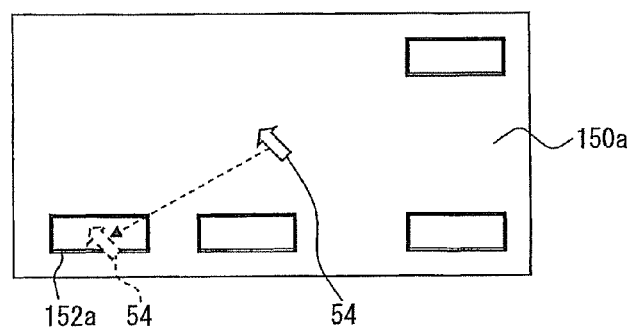
FIG. 9 is a diagram illustrating a display window on the screen according to the second embodiment.
Figure 10:
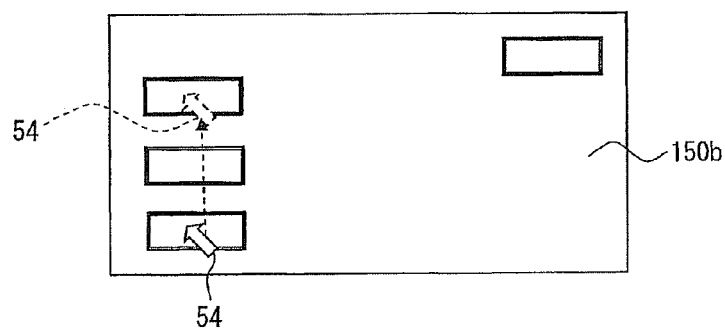
FIG. 10 is a diagram illustrating a display window displayed on the screen after the display window of FIG. 9, according to the second embodiment.
Figure 11:
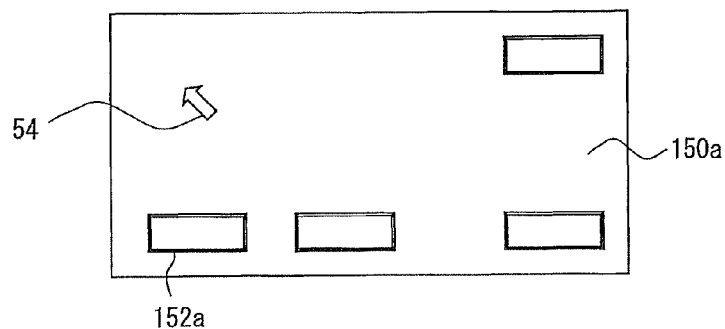
FIG. 11 is a diagram illustrating a display window displayed on the screen after the display window of FIG. 10, according to the second embodiment.

Such an operation of the controller 22 makes the remote manipulation apparatus 10 and the screen 40a operate as follows. For instance, the navigation apparatus 32 displays alternately a first display window 150a and a second display window 150b on the screen 40a of the display apparatus 40 (refer to FIGS. 9 to 11). FIG. 9 illustrates a state where the first display window 150a is displayed on the screen 40a. FIG. 10 illustrates a state where the second display window 150b is displayed on the screen 40a. FIG. 11 illustrates a state where the first display window 150a is displayed again on the screen 40a.

First and second display window data sets of the first and second display windows 150a, 150b are stored, respectively, in the buffer 22a. The first display window data set of the first display window 150a includes data related with a button image assigned with the selector-pulling information. The second display window data set of the second display window 150b does not include data related with a button image assigned with the selector-pulling information. The controller 22 prepares first and second reactive force maps for the two display window data sets, respectively.

First, as indicated in FIG. 9, the navigation apparatus 32 displays the first display window 150a in the display apparatus 40. The controller 22 selects the first reactive force map corresponding to the first display window 150a based on the window information from the navigation apparatus 32. Since the first reactive force map includes a button image 152a assigned with the selector-pulling information, the controller 22 drives to pull the manipulating handle 14 to a position corresponding to the button image 152a. The pointer image 54 on the screen 40a also moves to accompany the drive of the manipulating handle 14 (refer to the broken line arrow in FIG. 9). When the status of the pulling operation becomes in the complete mode, the controller 22 counts a number of times a pulling operation relative to the first display window 150a is performed and stores the number counted.

Then, when the second display window 150b in FIG. 10 is displayed on the screen 40a, the controller 22 selects the second reactive force map for the second display window 150b. The second display window 150b includes button images; the second reactive force map does not include a button image assigned with the selector-pulling information. Thus, without the pulling operation of the manipulating handle 14, a usual reactive force to manipulation is performed. The pointer image 54 on the screen 40a is moved by user's manipulating the manipulating handle 14.

Thereafter, as indicated in FIG. 11, the first display window 150a appears again on the screen 40a. In the first embodiment, the controller 22 thereby drives to pull the manipulating handle 14 to the position corresponding to the button image 152a assigned with the selector-pulling information included in the first reactive force map of the first display window 150a. However, under the second embodiment, a different operation is made. That is, since the pulling operation of the manipulating handle 14 has been completed once with respect to the first display window 150a, the controller 22 does not perform the pulling operation of the manipulating handle 14 even though the first reactive force map includes a button image 152a assigned with the selector-pulling information. Instead, the controller 22 performs a usual reactive force to manipulation.

Under the above-mentioned configuration, the controller 22 operates as follows. With respect to a specified display window (i.e., the first display window 150a), the pulling operation of the manipulating handle 14 may be performed a predetermined number of times (i.e., one time in the present embodiment). In this case, even though the specified display window is again displayed on the screen 40a, the pulling operation is prohibited. Such prohibition of the pulling operation may appropriately respond to an intention of a user to want no longer automatic pulling operation. When the operation to the button image 152a assigned with the selector-pulling information is completed, an additional operation to the button image 152a is unnecessary. In such a case, the user may no longer want the automatic drive of the manipulating handle 14 to the position corresponding to the button image 152a, and the automatic movement of the pointer image 54 onto the button image 152a. Therefore, the present embodiment may reduce the troublesomeness felt by the user when the pulling operation of the manipulating handle 14 is performed repeatedly each time the specified display window is displayed.

Figure 8:
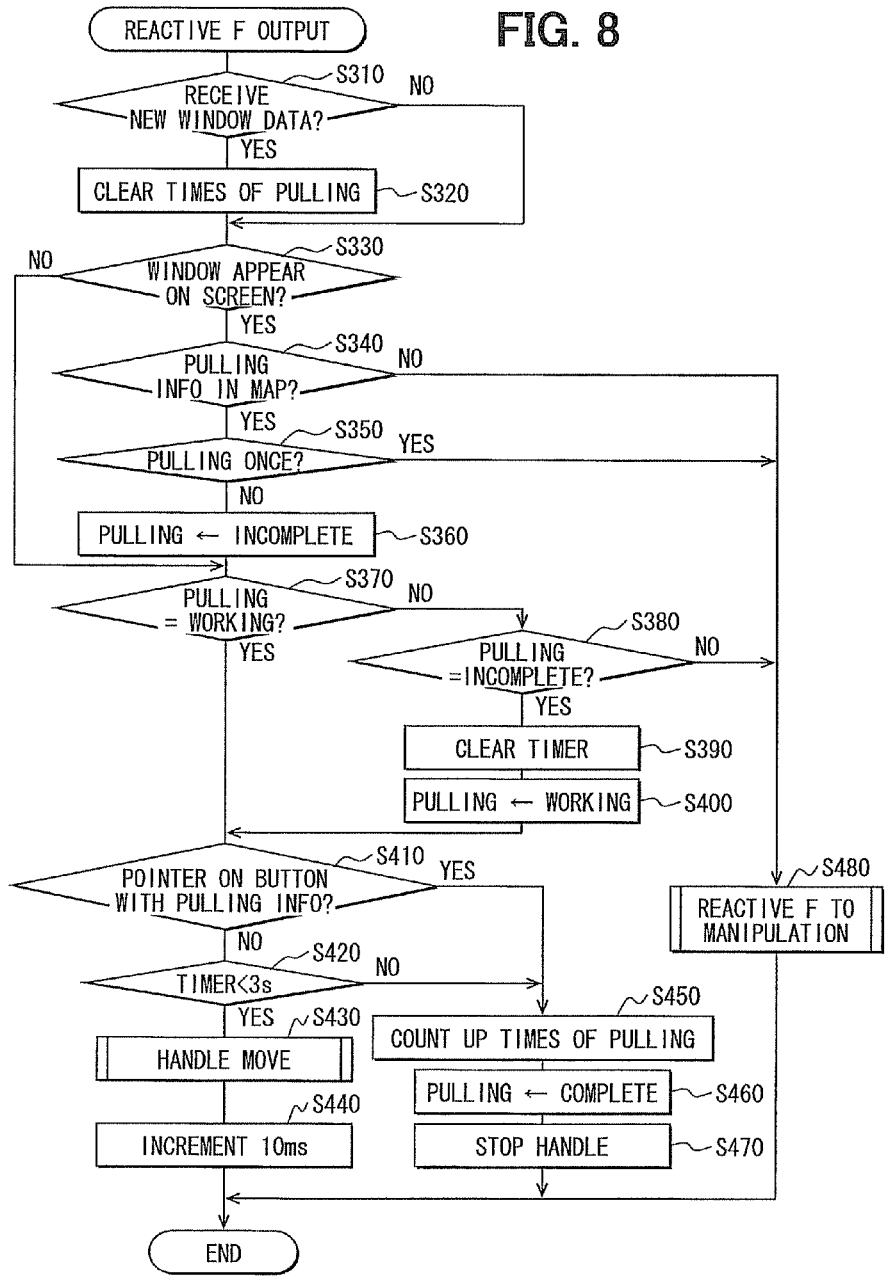
FIG. 8 is a flowchart illustrating a reactive force output process by the controller according to a second embodiment.

With reference to FIG. 8, the following will explain a process of the controller 22 for realizing the configuration mentioned above. The main process of the second embodiment is the same as that of the first embodiment in FIG. 4 except S60; thus, the explanation of the main process is omitted. The different point from the first embodiment about the main process will be explained as needed.

At S310, it is determined whether a display window data set is received newly. Specifically, at S50 of the main process, it is determined whether the communication IC 24 newly acquires a display window data set. When a display window data set is acquired newly, the controller 22 clears at S320 a stored record of the number of times of the pulling operation of the manipulating handle 14 that is applied to the reactive force map of the new display window data set. When a display window data set is not acquired newly, the processing proceeds to S330 without executing S320.

At S330, similar to S110 of FIG. 5, it is determined whether the display window currently displayed on the screen 40a appears newly after the previous reactive force output process was executed. Specifically, it is determined whether new window information was obtained at S50 of the main process in FIG. 4. When it is determined that the display window on the screen 40a appears newly, the processing proceeds to S340. When it is determined that the display window on the screen 40a is not substituted newly, the processing proceeds to S370. When a display window is displayed on the screen 40a for the first time after the main process starts, it is determined that the display window on the screen 40a appears newly, advancing the processing to S340.

At S340 identical to S130 of FIG. 5, it is determined whether the selector-pulling information is included in the reactive force map corresponding to the display window displayed on the screen 40a. When the first display window 150a is displayed on the screen 40a, the processing proceeds to S350. When the second display window 150b is displayed on the screen 40a, the processing proceeds to S480.

At S350, it is determined whether the number of times of the pulling operation of the manipulating handle 14 with respect to the display window currently displayed on the screen 40a is one or greater. When the controller 22 stores the number of times being equal to or more than one, the processing proceeds to S480. When the controller 22 stores the number of times being zero, the processing proceeds to S360.

At S360 identical to S120 of FIG. 5, the status of the pulling operation is set to the incomplete mode.

At S370 identical to S140 of FIG. 5, it is determined whether the status of the pulling operation is set at the working mode. Under the repetition of S20 to S60, Unless S400 mentioned later is executed after a display window on the screen 40a appears, it is determined that the status of the pulling operation is not in the working mode, advancing the processing to S380. Under the repetition of S20 to S60, while the display window on the screen 40a is not substituted, S400 mentioned later is executed once and then the pulling operation of the manipulating handle 14 is not completed. In this case, it is determined that the status of the pulling operation is under the working mode, advancing the processing to S410.

At S380 identical to S150 of FIG. 5, it is determined whether the status of the pulling operation is in the incomplete mode. When the status of the pulling operation is in the complete mode, the processing proceeds to S480. In contrast, when the status of the pulling operation is in the incomplete mode, the processing proceeds to S390.

At S390 identical to S160 of FIG. 5, a timer of the pulling operation is cleared, advancing the processing to S400. At S400 identical to S160 of FIG. 5, the status of the pulling operation is set to the working mode. The processing then proceeds to S410.

At S410 identical to S180 of FIG. 5, it is determined that the position of the manipulating handle 14 relative to the manipulation basis position P1 corresponds to the on-screen position of the button image assigned with the selector-pulling information relative to the screen basis position P2. For example, when the first display window 150a (refer to FIG. 9) is displayed on the screen 40a, it is determined whether the position of the manipulating handle 14 relative to the manipulation basis position P1 corresponds to the on-screen position of the outline portion of the button image 152a assigned with the selector-pulling information relative to the screen basis position P2 in the first display window 150a. When it is determined that the position of the manipulating handle 14 relative to the manipulation basis position P1 does not correspond to the on-screen position of the button image 152a assigned with the selector-pulling information relative to the screen basis position P2, the processing proceeds to S420. When it is determined that the position of the manipulating handle 14 relative to the manipulation basis position P1 corresponds to the on-screen position of the button image 152a assigned with the selector-pulling information relative to the screen basis position P2, the processing proceeds to S450. The controller 22 counts up the number of times of the pulling operation and stores the number counted to be associated with the first display window 150a. The processing then proceeds to S460. At S460, the status of the pulling operation is set to the complete mode. At S470, the controller 22 stops the output of the drive signal to the x-axis motor 16a and the y-axis motor 16b, ending the reactive force output process.

At S420 identical to S190 of FIG. 5, it is determined whether the timer for the pulling operation is less than 3 seconds. When the timer is less than 3 seconds, the processing proceeds to S430. When the timer is not less than 3 seconds, the processing proceeds to S450.

At S430 identical to S200 of FIG. 5, the manipulating handle movement process is executed. Thereby, the manipulating handle 14 begins to move towards the position corresponding to the button image 152a assigned with the selector-pulling information. At S440, a predetermined time is added to the timer of the pulling operation. The predetermined time added may be just three seconds or less. The present embodiment adopts ten (10) milliseconds, for instance. After S440 is executed, the reactive force output process is ended.

Herein, S480 is executed (i) when the selector-pulling information is not included in the reactive force map selected at S340, (ii) when it is determined that the number of times of the pulling operation is one or more at S350, or (iii) when the status of the pulling operation is in the complete mode. The reactive force process executed at S480 is the same as that at S240 of the reactive force process in FIG. 5.

In particular, when it is determined that the number of times of the pulling operation is one or more at S350, the reactive force process is executed at S480. For instance, the pulling operation of the manipulating handle 14 is performed with respect to the specified display window (e.g., the first display window 150a in the present embodiment). After the number of times of the pulling operation is then counted up, the same specified display window may be displayed again.

In this case, the automatic pulling operation of the manipulating handle 14 may be prohibited from being performed.

Under the second embodiment, the controller 22 executing S450 may be referred to as a count section, device, or means. The controller 22 executing S330, S340, and S350 may be referred to as a prohibition section, device, or means.

Third Embodiment

A third embodiment has an additional configuration added to the pulling operation of the manipulating handle 14 in the first embodiment. The additional configuration is where when the communication IC 24 receives a notification signal to notify a user of vehicle information related to the vehicle, such as warning information on fuel residual quantity, the controller 22 vibrates the manipulating handle 14 compulsorily even during the pulling operation of the manipulating handle 14.

Figure 12:
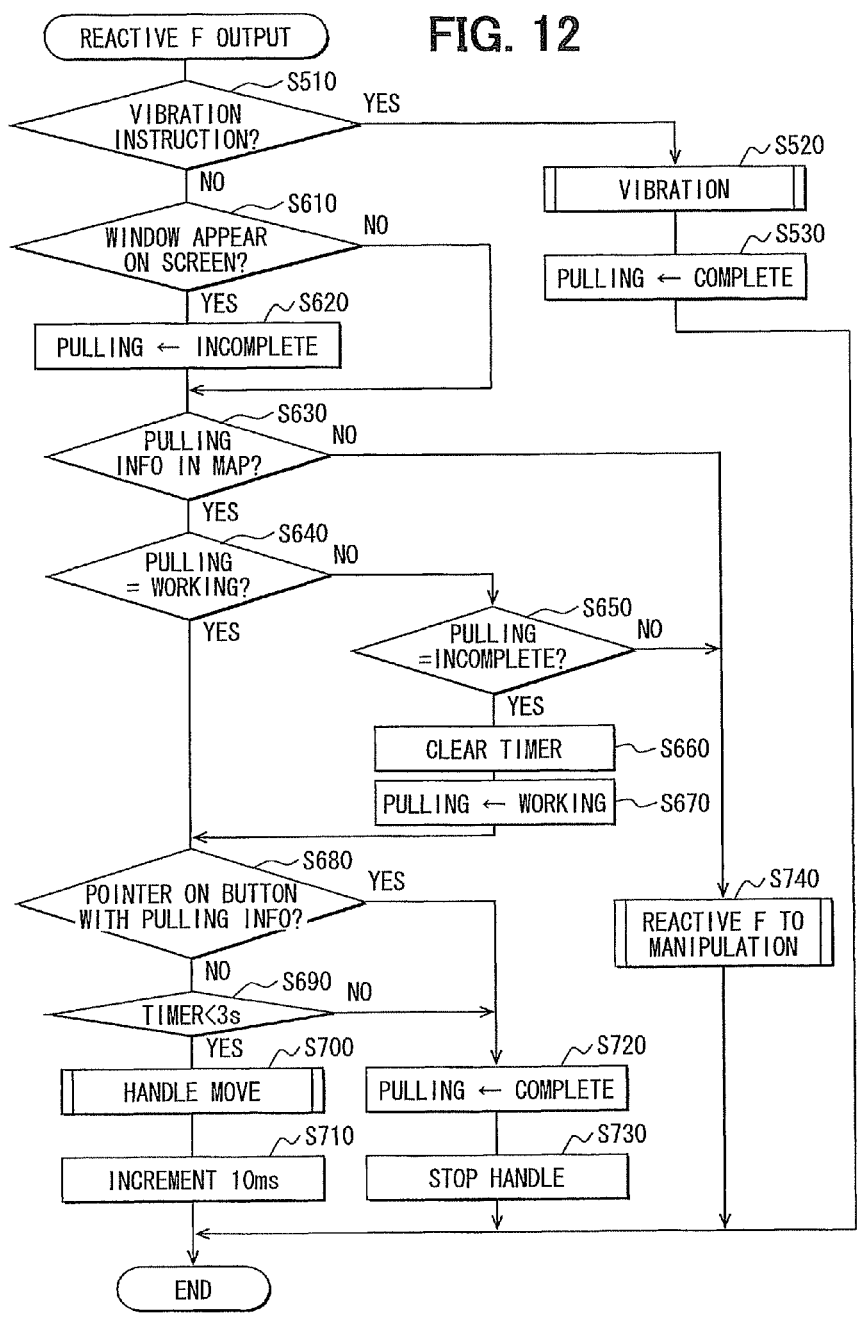
FIG. 12 is a flowchart illustrating a reactive force output process by the controller according to a third embodiment.

The following will explain a configuration different from the first embodiment with reference to FIG. 12. In the third embodiment, the communication IC 24 acquires a vibration generation instruction signal from the navigation apparatus 32 that is triggered by warning information of fuel residual quantity, transmitting the information of the signal acquired to the controller 22. The controller 22 generates a vibration generation instruction based on the information.

The main process of the second embodiment is the same as that of the first embodiment in FIG. 4 except S60; thus, the explanation of the main process is omitted. In addition, S610 to S740 in FIG. 12 are identical to S110 to S240 in FIG. 5; thus, the explanation thereof is also omitted.

At S510, it is determined whether a vibration generation instruction signal arises. When it is determined that a vibration generation instruction signal arises, the processing proceeds to S520. When the signal does not arise, the processing proceeds to S610, where the process explained in the first embodiment is executed.

At S520, a vibration generation process is executed so that the controller 22 outputs drive signals, which vibrates the manipulating handle 14, to the x-axis motor 16a and the y-axis motor 16b. This makes the manipulating handle 14 vibrate even while the pulling operation of the manipulating handle 14 is performed at the process from S610 to S740 in the previous reactive force output process. The amplitude of the vibration of the manipulating handle 14 may be only needed to be shorter than the magnitude of the movement of the pulling operation. In addition, the vibration direction of the manipulating handle 14 may be along the direction of the movement of the manipulating handle 14 at the pulling operation, and may be a direction intersecting with the direction of the movement. At S530, the status of the pulling operation is set to the complete mode, ending the reactive force output process.

Thus, S510 to S530 are added to the reactive force output process for performing the pulling operation indicated in FIG. 5. When the communication IC 24 receives the vibration generation instruction signal, the controller 22 vibrates the manipulating handle 14 compulsorily. This enables the user to acquire a different sense (vibration) in the middle of the drive of the manipulating handle 14. The user may recognize that the vehicle had a certain change, for example, special information is provided from the vehicle via the hand that touches the manipulating handle 14. At this time, the navigation apparatus 32 displays warning information on the screen 40a of the display apparatus 40. In addition, the warning information may be provided in a combined instrument of the vehicle.

It is noted that the communication ID 24 may be referred to as a reception portion. The controller executing S510 and S520 may be referred to as a vibration section, device, or means.

Other Embodiments

Up to this point, the description has been given to the first to third embodiments of the present disclosure. However, the present disclosure is not limited to the above embodiments, and it can be variously embodied within a scope not departing from the subject matter of the present disclosure.

In the third embodiment, S510 to S530 are added to the flowchart of the first embodiment. Alternatively, S510 to S530 may be added to the flowchart of FIG. 8 in the second embodiment. Those may be added just before S310.

In the second embodiment, the number of times of the pulling operation for prohibiting the pulling operation of the manipulating handle 14 is once. The number of times may be determined as needed. The number of times may be determined for a user not to feel troublesome. In addition, the number of times may be determined for each display window.

In the above embodiments, the pointer image is adopted as a selector image. It may be a cursor image for emphasizing a button image which can be selected. The cursor image may be designed to differentiate between the outline shape of a button image to be selectable and the outline shape of a button image different from the button to be selected. The cursor image is for emphasizing a button image; thus, the cursor image is located only in either of button images, unlike the pointer image. When a button image assigned with the selector-pulling information is included in a display window that newly appears, the cursor image is immediately displayed on the button image assigned with the selector-pulling information without moving over to the button image assigned with the selector-pulling information gradually. In such a case, the manipulating handle moves to the position corresponding to the button image gradually like the previous embodiments.

Furthermore, in the above embodiments, the manipulation basis position is located at a position from which the manipulating handle may move to cover all the orientations, whereas the screen basis position is located at the center of the screen. The manipulation basis position and the screen basis position may be changed suitably. For example, the manipulation basis position may be located at a lower left position in FIG. 3B; the screen basis position may be located at an upper right on the screen in FIG. 3A. In such a configuration, a coordinate transformation may be necessary for associating the movement of the manipulating handle with the movement of the pointer image or the cursor image on the screen.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular manipulation apparatus to display a selector image and a display window on a screen of a display apparatus, the display window containing a button image to operate an in-vehicle apparatus, the vehicular manipulation apparatus moving the selector image to the button image to select the button image, the vehicular manipulation apparatus comprising:

a main body;

a manipulating portion provided in the main body to be manipulated by a user to perform a movement to a manipulation position that is defined as a position relative to a manipulation basis position, the manipulation basis position being defined on a basis of the main body;

a detector to detect a detected direction and a detected magnitude of the movement of the manipulating portion;

a display control section to control a selector position of the selector image depending on the detected direction and the detected magnitude of the movement of the manipulating portion, the selector position being defined as a position on the screen relative to a screen basis position, the screen basis position being defined on a basis of the screen, the screen basis position corresponding to the manipulation basis position;

a determination section to determine whether the display window appearing on the screen contains a specified button image that is a button image assigned with selector-pulling information indicating pulling of the selector image onto the specified button image;

a drive section to drive the manipulating portion to permit an automatic movement of the manipulating portion to cause the manipulation position to correspond to a specified button position when it is determined that the display window appearing on the screen contains the specified button image, the specified button position being defined on the screen as a position of the specified button image relative to the screen basis position; and a stop section to stop the driving of the manipulating portion by the drive section during the automatic movement, when an external force is applied to the manipulating portion so as to prevent the manipulating portion from moving and cause a duration to exceed a predetermined time under a state where the manipulation position does not correspond to the specified button position of the specified button image assigned with the selector-pulling information.

2. The vehicular manipulation apparatus according to claim 1, further comprising:

a reception portion to receive a vibration generation instruction signal for vibrating the manipulating portion; and a vibration section to vibrate the manipulating portion compulsorily when the reception portion receives the vibration generation instruction signal.

3. A vehicular manipulation apparatus to display a selector image and a display window on a screen of a display apparatus, the display window containing a button image to operate an in-vehicle apparatus, the vehicular manipulation apparatus moving the selector image to the button image to select the button image, the vehicular manipulation apparatus comprising:

a manipulating portion to perform a movement relative to a manipulation basis position;

a detector to detect a detected direction and a detected magnitude of the movement of the manipulating portion relative to the manipulation basis position;

a display control section to control a selector position of the selector image on the screen depending on the detected direction and the detected magnitude of the movement of the manipulating portion; and a drive section to move the manipulating portion to a position that corresponds to a specified button image on the screen when the display window containing the specified button image appears on the screen, the specified button image being a button image assigned with selector-pulling information, the selector-pulling information asserting automatically pulling the selector image to the specified button image, wherein:

the display window contains a plurality of button images that includes at least one of the specified button image assigned with selector-pulling information and a non-specified button image that is a button image assigned with no-selector-pulling information, the no-selector-pulling information negating automatically pulling the selector image to the non-specified button image; and the specified button image assigned with the selector-pulling information asserting automatically pulling the selector image to the specified button image is stored in a storage to be differentiated from the non-specified button image assigned with no selector-pulling information negating automatically pulling the selector image to the non-specified button image such that:

the specified button image is stored as being associated with an identification indicating that the selector-pulling information is assigned, whereas the non-specified button image is stored as being associated with an identification indicating that the selector-pulling information is not assigned.

4. The vehicular manipulation apparatus according to claim 3, further comprising:

a determination section to determine whether the specified button image assigned with the selector-pulling information is included in the display window each time the display window appears on the screen.

* * * * *